US008817639B2

(12) United States Patent
Kee

(10) Patent No.: US 8,817,639 B2
(45) Date of Patent: Aug. 26, 2014

(54) COMFORT NOISE GENERATION BY A HEADSET THAT IS ASSOCIATED WITH A VOIP-ENABLED DEVICE

(75) Inventor: Tommy Wing Chau Kee, Richmond (CA)

(73) Assignee: Broadcom Corporation, Irvine, CA (US)

( * ) Notice: Subject to any disclaimer, the term of this patent is extended or adjusted under 35 U.S.C. 154(b) by 649 days.

(21) Appl. No.: 12/890,404

(22) Filed: Sep. 24, 2010

(65) Prior Publication Data

US 2012/0076012 A1 Mar. 29, 2012

(51) Int. Cl.
*G01R 31/08* (2006.01)
(52) U.S. Cl.
USPC .......................................................... 370/252

(58) Field of Classification Search
None
See application file for complete search history.

(56) References Cited

U.S. PATENT DOCUMENTS

| 8,213,343 B2 * | 7/2012 | Perraud et al. ............... 370/278 |
| 2002/0120439 A1 * | 8/2002 | Mekuria et al. .............. 704/215 |
| 2009/0296616 A1 | 12/2009 | Lim et al. |
| 2011/0194538 A1 * | 8/2011 | Zheng et al. ................. 370/335 |

* cited by examiner

*Primary Examiner* — Chi Pham
*Assistant Examiner* — Kouroush Mohebbi
(74) *Attorney, Agent, or Firm* — Fiala & Weaver P.L.L.C.

(57) ABSTRACT

A VoIP-enabled device is configured to detect silence in incoming VoIP communication. The VoIP-enabled device is configured to transmit a silence indicator to a headset in response to detecting silence in the incoming VoIP communication. The silence indicator specifies that the headset is to generate comfort noise and to incorporate the comfort noise into the speech during the period of silence.

25 Claims, 8 Drawing Sheets

COMFORT NOISE GENERATION BY A HEADSET THAT IS ASSOCIATED WITH A VOIP-ENABLED DEVICE

BACKGROUND OF THE INVENTION

1. Field of the Invention

The present invention generally relates to generation of comfort noise by a headset that is associated with a VoIP-enabled device.

2. Background

Voice over Internet Protocol (VoIP) enables the transfer of communications that include voice data over a packet-switched data network, such as the Internet. Devices that support VoIP communications may be referred to as VoIP-enabled devices. A VoIP-enabled device may be a dedicated VoIP telephone or personal digital assistant (PDA), for example, which is capable of initiating and receiving telephone calls without the use of a computer. In another example, the VoIP-enabled device may be a computer having software installed thereon that enables the computer to initiate and/or receive telephone calls. In yet another example, the VoIP-enabled device may be a mobile phone that uses a fourth generation (4G) or later cellular network, such as a Long Term Evolution (LTE) network.

A VoIP-enabled device may communicate with another VoIP-enabled device by receiving a communication that includes voice data over a network from the other VoIP-enabled device and/or by transmitting a communication that includes voice data over the network to the other VoIP-enabled device. Upon receiving such a communication, a VoIP-enabled device may process (e.g., decode) the communication to generate speech based on the voice data. VoIP-enabled devices traditionally generate comfort noise and insert that comfort noise into any periods of silence in the speech that the VoIP-enabled devices generate. Comfort noise is noise that is generated to simulate background noise in speech. For example, such comfort noise may serve as an indicator to a person who is using a VoIP-enabled device that a call in which the person is participating remains connected.

A VoIP-enabled device may be associated with a headset, so that a user of the headset may listen to speech using the headset rather than the VoIP-enabled device. For example, the VoIP-enabled device may wirelessly transmit a voice signal that represents the speech to the headset. However, transmission of a voice signal that includes comfort noise by the VoIP-enabled device and/or subsequent processing of the voice signal at the headset may consume substantial resources (e.g., power, bandwidth, etc.) of the VoIP-enabled device and/or the headset.

BRIEF SUMMARY OF THE INVENTION

A system and/or method for generation of comfort noise by a headset that is associated with a VoIP-enabled device, substantially as shown in and/or described in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 3:
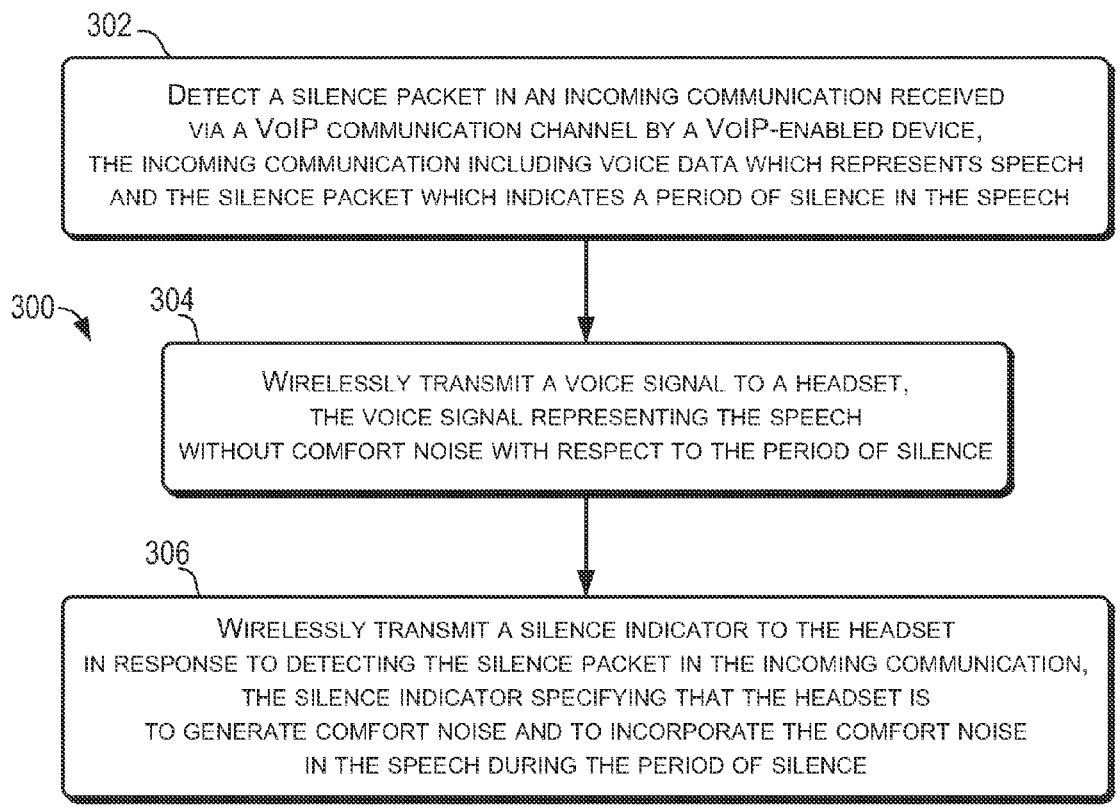
Figure 7:
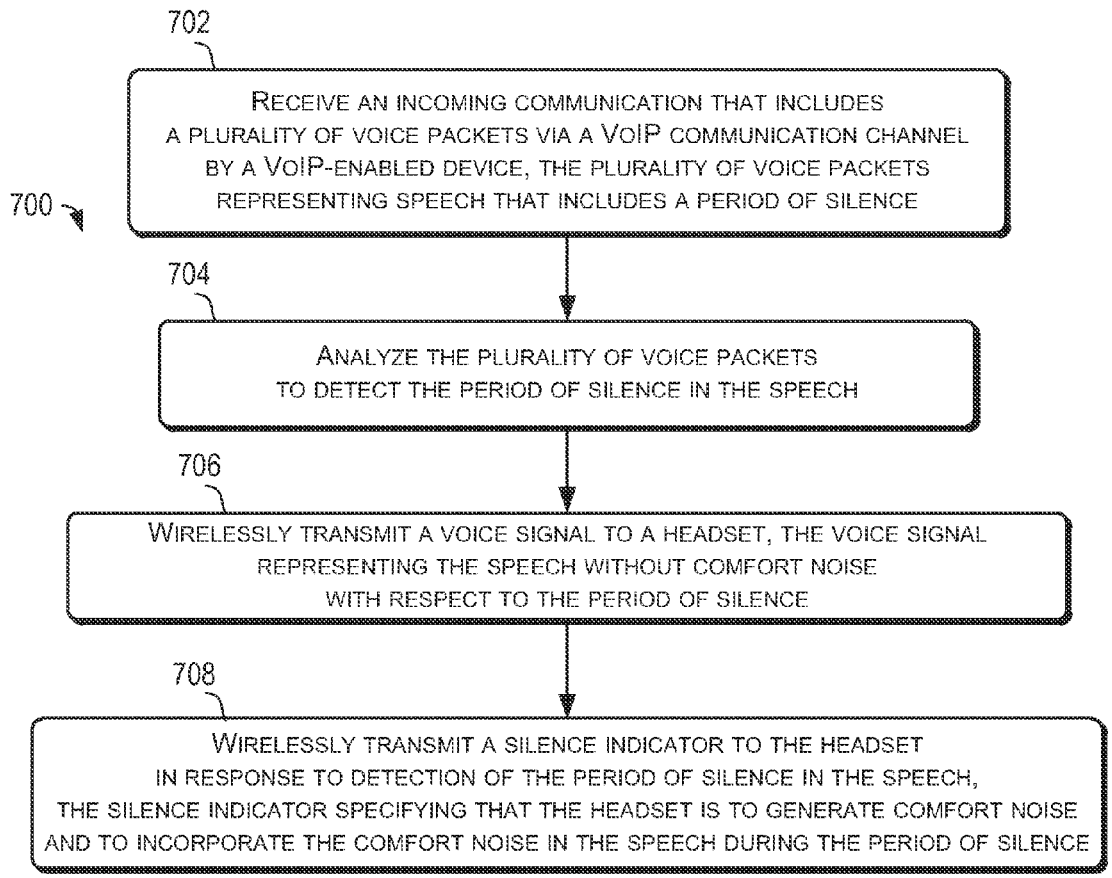
Figure 8:
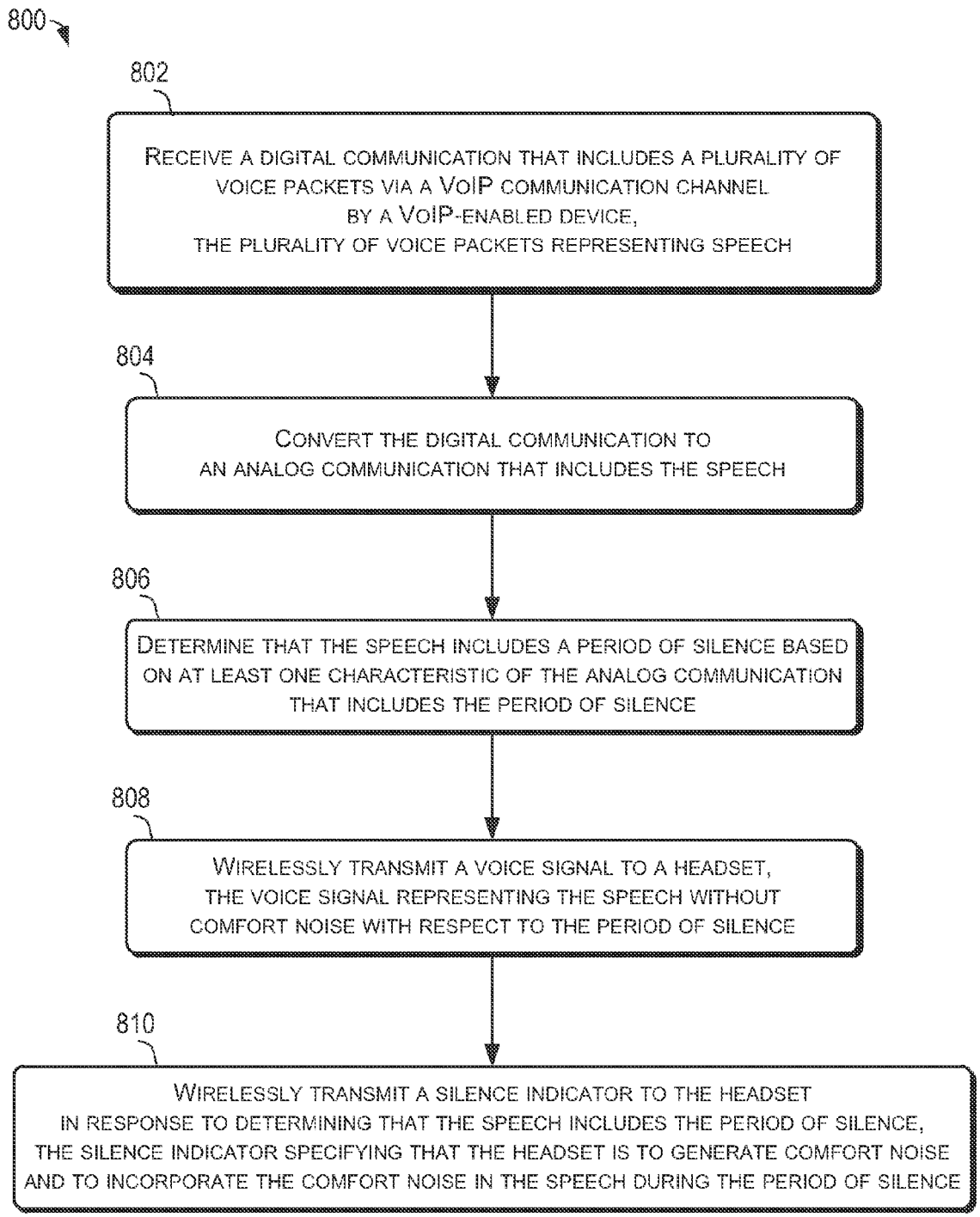

FIGS. 3, 7, and 8 depict flowcharts of methods for transmitting a silence indicator from a VoIP-enabled device to an associated headset in accordance with embodiments described herein.

Figure 4:
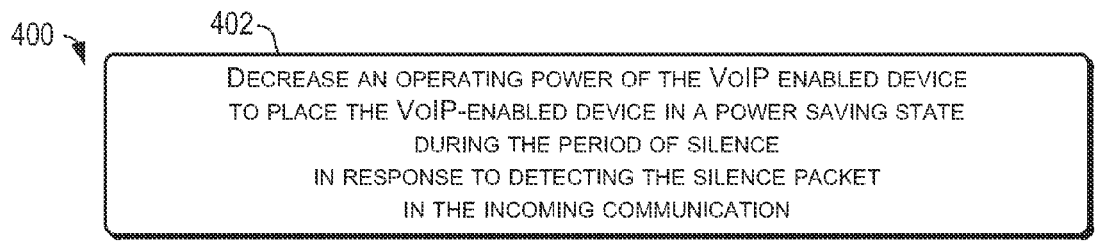
Figure 5:
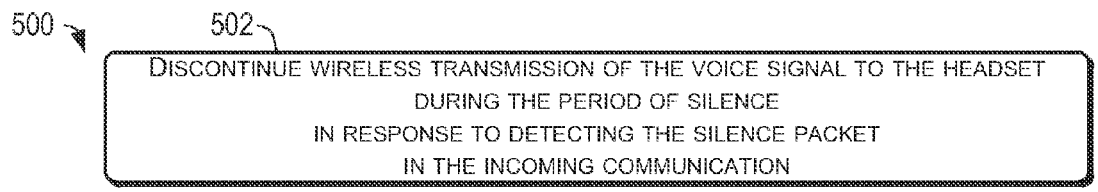

FIGS. 4 and 5 depict variations of the flowchart shown in FIG. 3 in accordance with embodiments described herein.

Figure 2:
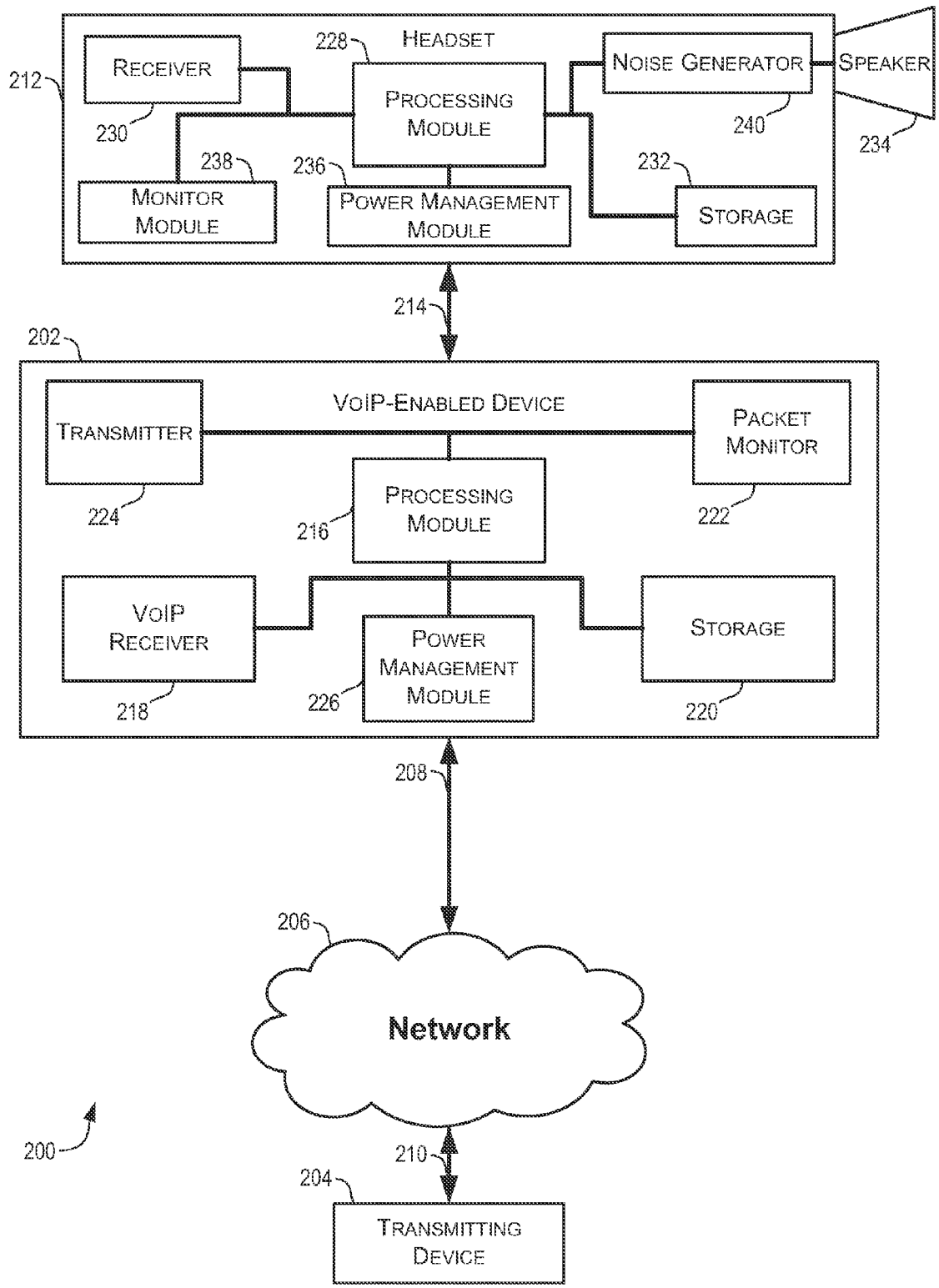
FIG. 2 shows a block diagram of a VoIP communication system in accordance with an embodiment described herein.
Figure 6:
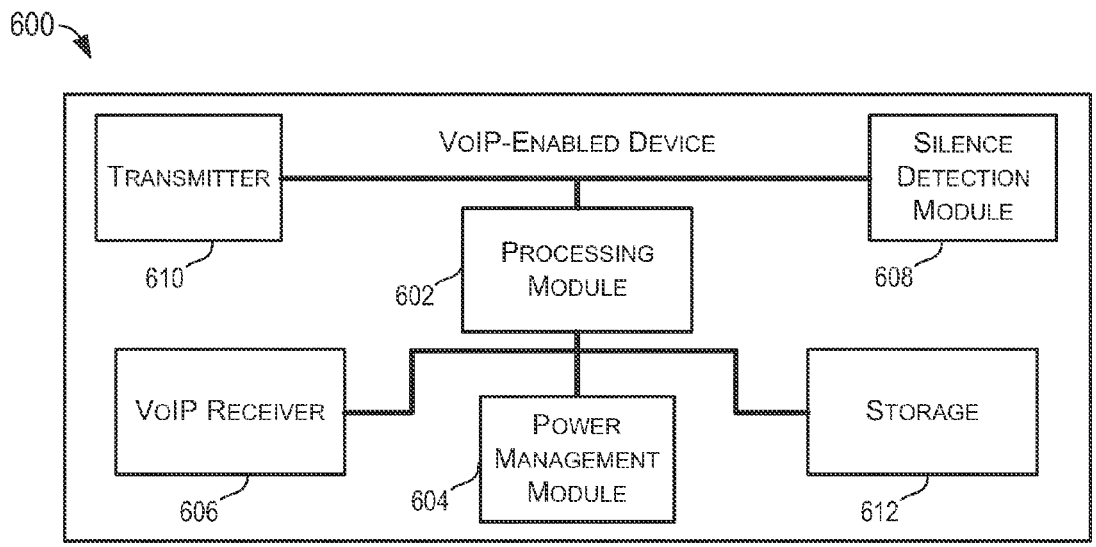

FIG. 6 shows an example implementation of a VoIP-enabled device shown in FIG. 2 in accordance with an embodiment described herein.

Figure 9:
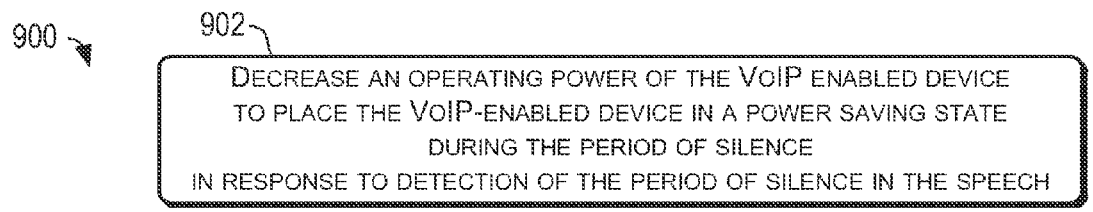
Figure 10:
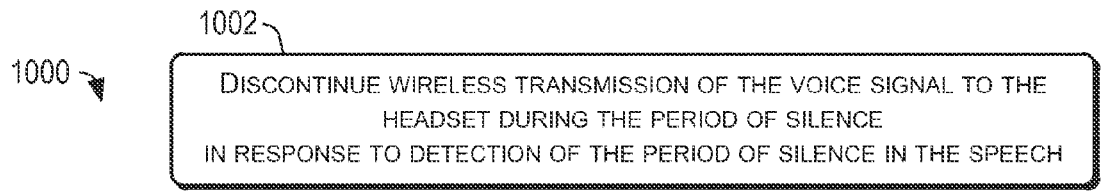

FIGS. 9 and 10 depict variations of the flowcharts shown in FIGS. 7 and 8 in accordance with embodiments described herein.

Figure 11:
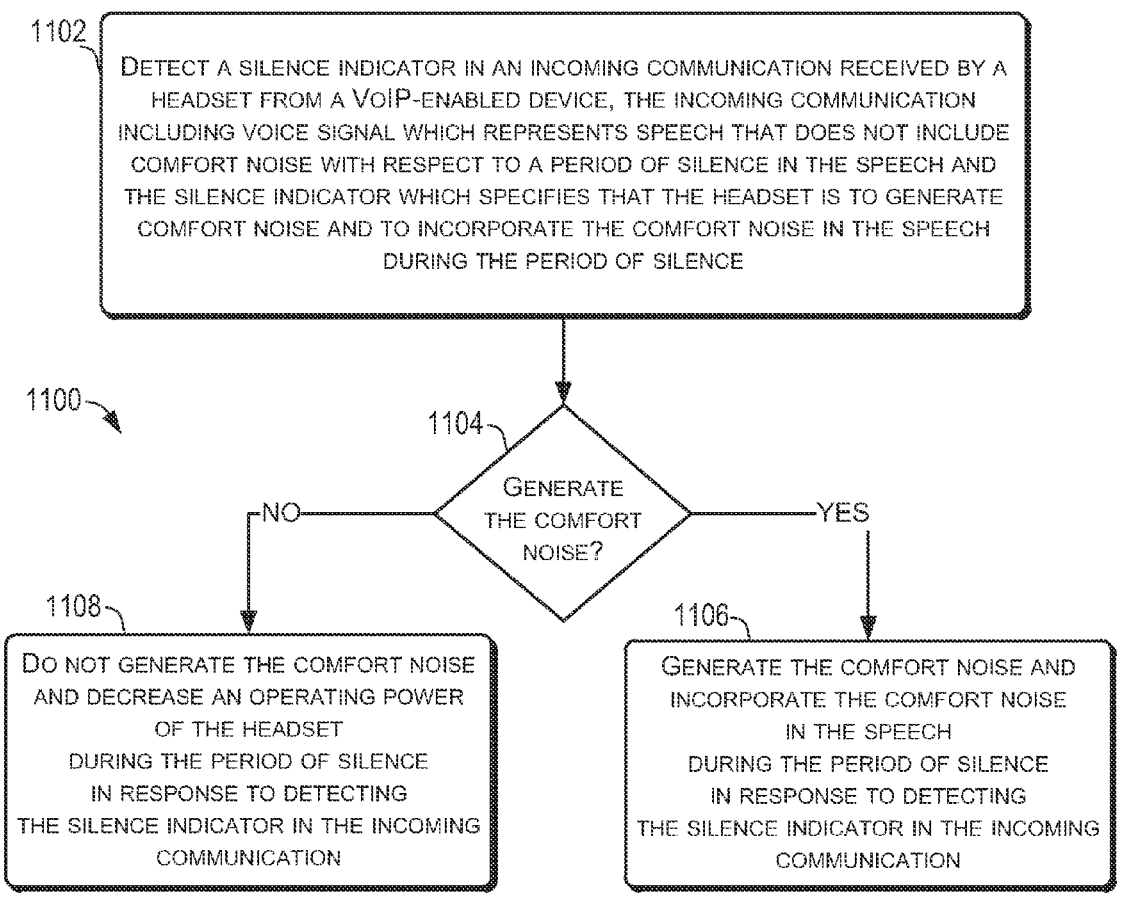

FIG. 11 depicts a flowchart of a method for performing an action in response to detecting a silence indicator at a headset in accordance with an embodiment described herein.

Figure 12:
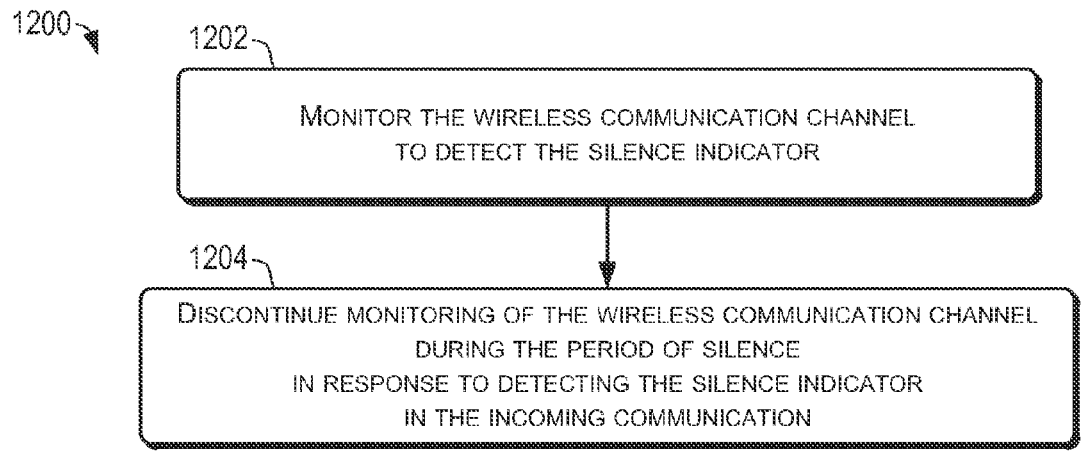

FIG. 12 depicts a variation of the flowchart shown in FIG. 11 in accordance with an embodiment described herein.

Figure 13:
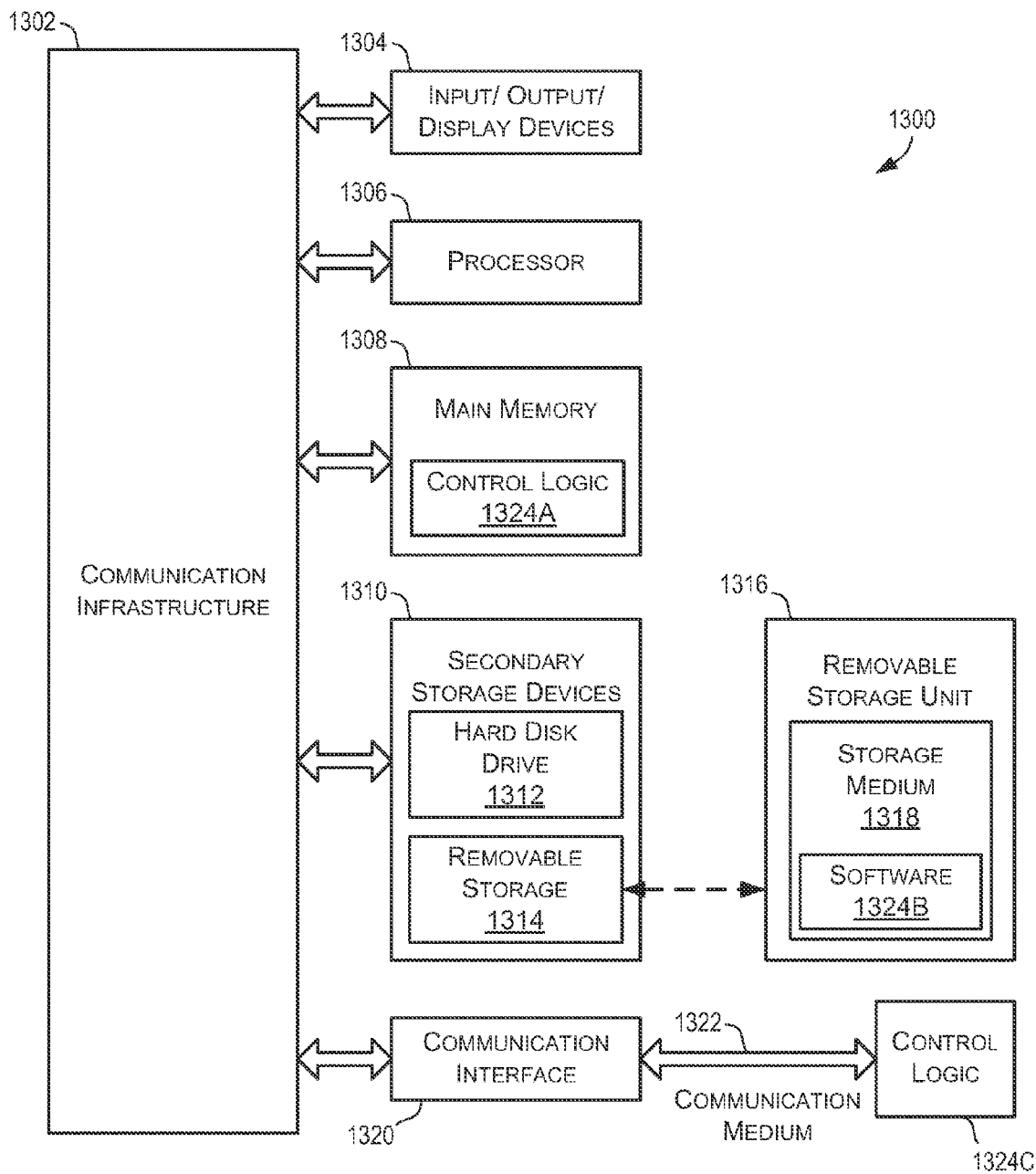

FIG. 13 is a block diagram of an example computer system in which embodiments may be implemented.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Various approaches are described herein for, among other things, generating comfort noise by a headset that is associated with a Voice over Internet Protocol-enabled (VoIP-enabled) device. The VoIP-enabled device is configured to detect a period of silence in an incoming VoIP communication. The VoIP-enabled device is further configured to transmit a silence indicator to the headset in response to detecting the period of silence. The silence indicator specifies that the headset is to generate comfort noise and to incorporate the comfort noise in the speech during the period of silence.

An example VoIP-enabled device is described that includes a packet monitor and a wireless transmitter. The packet monitor is configured to detect a silence packet in an incoming communication that is received via a VoIP communication channel. The incoming communication includes voice data which represents speech. The incoming communication further includes the silence packet which indicates a period of silence in the speech. The wireless transmitter is configured to wirelessly transmit a voice signal to a headset. The voice signal represents the speech without comfort noise with respect to the period of silence. The wireless transmitter is also configured to wirelessly transmit a silence indicator to the headset in response to detection of the silence packet in the incoming communication. The silence indicator specifies that the headset is to generate comfort noise. The silence indicator further specifies that the headset is to incorporate the comfort noise in the speech during the period of silence.

An example headset is described that includes a monitor module, a power management module, and a noise generator. The monitor module is configured to detect a silence indicator in an incoming communication that is received via a wireless communication channel from a VoIP-enabled device. The incoming communication includes a voice signal which represents speech that does not include comfort noise with respect to a period of silence in the speech. The incoming communication further includes the silence indicator. The silence indicator specifies that the headset is to generate comfort noise. The silence indicator further specifies that the headset is to incorporate the comfort noise in the speech during the period of silence. The power management module is configured to decrease an operating power of the headset to place the headset in a power saving state for a duration of the period of silence in response to detection of the silence indicator in the incoming communication. The noise generator is configured to generate comfort noise for the duration of the period of silence in response to detection of the silence indicator in the incoming communication.

An example method is described in which a silence packet is detected in an incoming communication that is received via a VoIP communication channel by a VoIP-enabled device. The incoming communication includes voice data which represents speech. The incoming communication further includes the silence packet which indicates a period of silence in the speech. A voice signal is wirelessly transmitted to a headset. The voice signal represents the speech without comfort noise with respect to the period of silence. A silence indicator is wirelessly transmitted to the headset in response to detecting the silence packet in the incoming communication. The silence indicator specifies that the headset is to generate comfort noise. The silence indicator further specifies that the headset is to incorporate the comfort noise in the speech during the period of silence.

Another example method is described in which an incoming communication is received that includes voice packets via a VoIP communication channel at a VoIP-enabled device. The voice packets represent speech that includes a period of silence. The voice packets are analyzed to detect the period of silence in the speech. A voice signal is wirelessly transmitted to a headset. The voice signal represents the speech without comfort noise with respect to the period of silence. A silence indicator is wirelessly transmitted to the headset in response to detection of the period of silence in the speech. The silence indicator specifies that the headset is to generate comfort noise. The silence indicator further specifies that the headset is to incorporate the comfort noise in the speech during the period of silence.

Yet another example method is described in which a digital communication that includes voice packets is received via a VoIP communication channel at a VoIP-enabled device. The voice packets represent speech. The digital communication is converted to an analog communication that includes the speech. A determination is made that the speech includes a period of silence based on at least one characteristic of a portion of the analog communication that includes the period of silence. A voice signal is wirelessly transmitted to a headset. The voice signal represents the speech without comfort noise with respect to the period of silence. A silence indicator is wirelessly transmitted to the headset in response to determining that the speech includes the period of silence. The silence indicator specifies that the headset is to generate comfort noise. The silence indicator further specifies that the headset is to incorporate the comfort noise in the speech during the period of silence.

Still another example method is described in which a silence indicator is detected in incoming communication that is received via a wireless communication channel by a headset from a VoIP-enabled device. The incoming communication includes a voice signal which represents speech that does not include comfort noise with respect to a period of silence in the speech. The incoming communication further includes the silence indicator. The silence indicator specifies that the headset is to generate comfort noise. The silence indicator further specifies that the headset is to incorporate the comfort noise in the speech during the period of silence. In response to detecting the silence indicator in the incoming communication, the method performs one of the following: (1) the comfort noise is generated and incorporated in the speech during the period of silence, or (2) the comfort noise is not generated, and an operating power of the headset is decreased to place the headset in a power saving state during the period of silence.

Techniques described herein that enable generation of comfort noise by a headset that is associated with a VoIP-enabled device have a variety of benefits as compared to conventional comfort noise generation techniques. For instance, the techniques described herein may enable the VoIP-enabled device to save power and/or processing bandwidth. For example, the operating power of the VoIP-enabled device may be reduced such that the VoIP-enabled device enters a power-saving state during a period of silence in speech. In another example, transmission of a voice signal from the VoIP-enabled device to the headset may be discontinued during the period of silence.

Furthermore, the techniques described herein may allow the headset to save power and/or processing bandwidth. For example, the operating power of the headset may be reduced when the headset is not generating comfort noise. In another example, monitoring of a wireless communication channel may be discontinued during a period of silence in speech.

Moreover, the techniques may directly or indirectly benefit the environment. The techniques may reduce the operation cost and/or extend the battery life of VoIP-enabled devices and associated headsets. Embodiments may be configured to operate in accordance with a power over Ethernet (PoE) protocol, which may eliminate the need for a power supply line that is separate from a data line that is used for receipt and transmission of packets.

The techniques described herein are applicable to any suitable VoIP-enabled device and associated headset, such as personal computer (PC) soft phones, 3G or 4G and later mobile telephones and personal digital assistants (PDAs) having VoIP communication capabilities, Digital Enhanced Cordless Telecommunications (DECT) phones, etc.

II. Example Comfort Noise Generation Techniques

Figure 1:
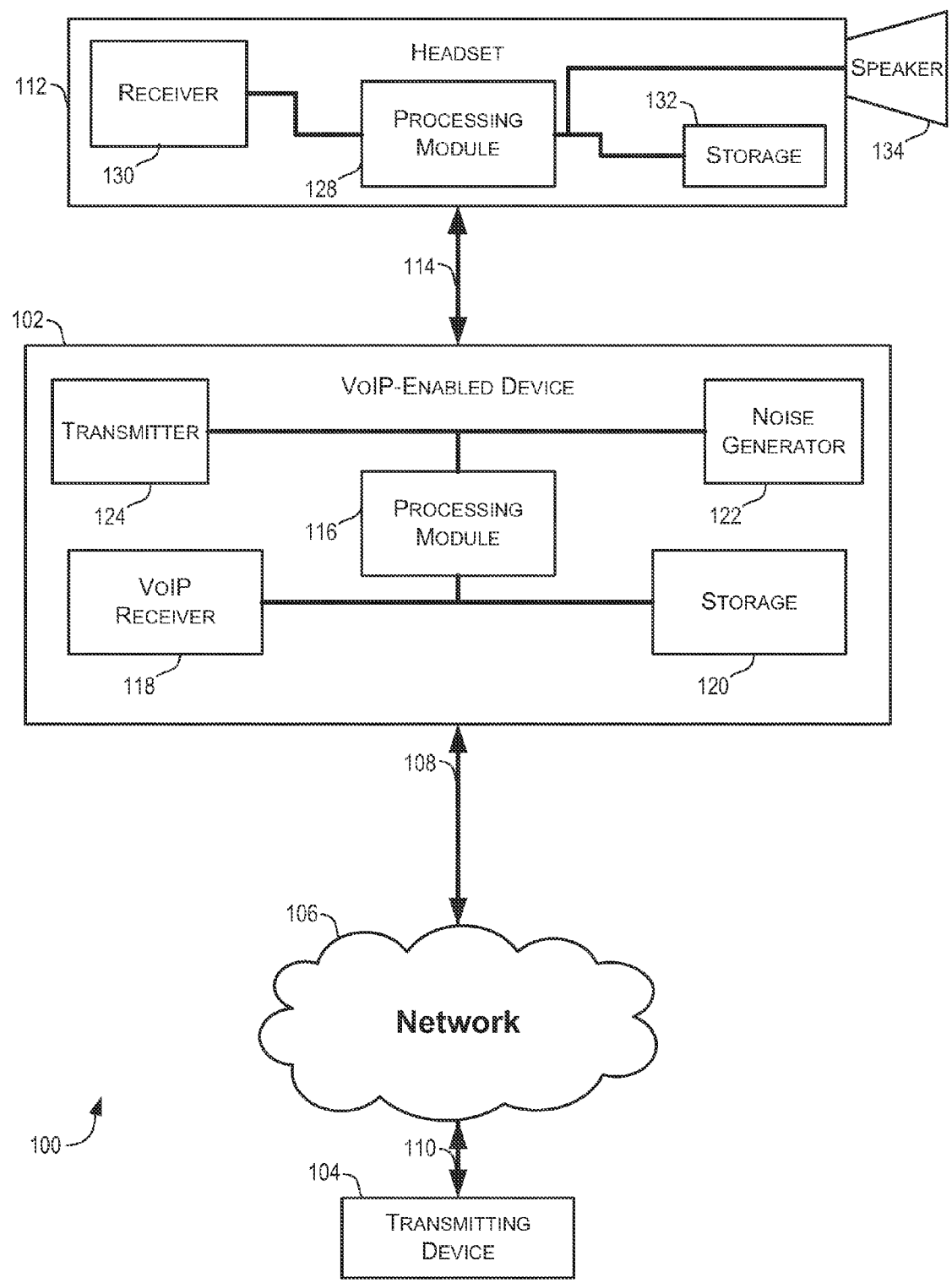
FIG. 1 shows a block diagram of a conventional system that supports Voice over Internet Protocol (VoIP) communication.

FIG. 1 shows a block diagram of a conventional system 100 that supports Voice over Internet Protocol (VoIP) communication. As shown in FIG. 1, system 100 includes a conventional VoIP-enabled device 102 that communicates with a transmitting device 104 over a network 106. VoIP-enabled device 102 transmits communications including voice data toward transmitting device 104 over network 106 using a first VoIP communication channel 108. Transmitting device 104 transmits communications including voice data toward VoIP-enabled device 102 over network 106 using a second VoIP communication channel 110. Depending upon implementation, voice data may represent periods of voice and periods of silence in speech, or the voice data may represent the periods of voice without representing the periods of silence. VoIP-enabled device 102 adds comfort noise to voice data that is received from transmitting device 104 to provide modified voice data. VoIP-enabled device 102 forwards the modified voice data to a headset 112 via a wireless communication channel 114 for delivery to a user.

In an example embodiment, a communication transmitted by VoIP-enabled device 102 using VoIP communication channel 108 or by transmitting device 104 using VoIP communication channel 110 is substantially the same as a communication received by transmitting device 104 using VoIP communication channel 110 or by VoIP-enabled device 102 using VoIP communication channel 108, respectively. In another example embodiment, one or more devices (not shown) in network 106 may translate, convert, or otherwise change one or more characteristics (e.g., data format or address format) of a communication that is transmitted using VoIP communication channel 108 or VoIP communication channel 110.

VoIP-enabled device 102 includes a processing module 116, a VoIP receiver 118, storage 120, a noise generator 122, and a transmitter 124. VoIP receiver 118 is configured to receive incoming communications that are received from transmitting device 104 via network 106. For example, the incoming communication may include voice data which represents speech. The speech may include period(s) of voice and period(s) of silence. A period of voice in the speech may be a portion of the speech in which human voice is detected. A period of silence in the speech may be a portion of the speech in which an absence of human voice is detected. In one example, the voice data may represent only periods of voice in the speech. In another example, the voice data may represent both periods of voice and periods of silence in the speech. For instance, the incoming communication may include voice data and a silence packet which indicates a period of silence in the speech. VoIP-enabled device 102 may include a VoIP transmitter in addition to VoIP receiver 118. For instance, a VoIP transmitter and VoIP receiver 118 may be included in a VoIP transceiver that is configured to transmit VoIP communications to and receive VoIP communications from transmitting device 104 using VoIP communication channel(s) 108 and/or 110.

Processing module 116 is configured to process incoming communications that are received by VoIP receiver 118. For example, processing module 116 may be configured to decode an incoming communication to provide voice data that represents speech using one or more techniques known in the art. Processing module 116 may modify or supplement the voice data to insert comfort noise that is generated by noise generator 122 in period(s) of silence in the speech. For example, periods of silence may be interspersed between periods of voice in the speech. In accordance with this example, processing module 116 may fill the periods of silence with the comfort noise. Voice data that is modified or supplemented as described above with respect to processing module 116 may be referred to as modified voice data.

Storage 120 is configured to store computer software that, when executed by processing module 116, causes processing module 116 to process voice data that is included in incoming communications that are received by VoIP receiver 118. Noise generator 122 is configured to generate comfort noise that processing module 116 inserts in period(s) of silence in speech that is represented by voice data that is included in the incoming communications. VoIP-enabled device 102 may also include a microphone (not shown) and a speaker (not shown), where the speaker may generate sound and the microphone may record sound.

Transmitter 124 is configured to transmit wireless communications that include modified voice data to headset 112 using wireless communication channel 114. VoIP-enabled device 102 may include a receiver in addition to transmitter 124. For instance, transmitter 124 and a receiver may be included in a transceiver that is configured to transmit wireless communications to and receive wireless communications from headset 112 using wireless communication channel 114.

Headset 112 is configured to process wireless communications that are received from VoIP-enabled device 102. Accordingly, headset 112 is said to be associated with VoIP-enabled device 102. Headset 112 includes a processing module 128, a receiver 130, and a storage 132. Headset 112 also includes a speaker 134 and a microphone (not shown). Receiver 130 is configured to receive wireless communications from VoIP-enabled device 102 via wireless communication channel 114. For example, a wireless communication may include modified voice data that represents speech. The speech may include period(s) of voice and period(s) of comfort noise.

Processing module 128 is configured to process the wireless communications that are received by receiver 130. For example, processing module 128 may be configured to convert a wireless communication that includes modified voice data to an audio signal that includes period(s) of voice and period(s) of comfort noise, as represented by the modified voice data in the wireless communication. The wireless communication may be in a digital format, and the audio signal may be in an analog format, though the scope of the example embodiments is not limited in this respect. The audio signal may be in a form that is suitable for speaker 134 to generate sound that corresponds to the speech that is represented by the modified voice data. In accordance with this example, processing module 128 may transmit the audio signal to speaker 134.

Storage 132 is configured to store computer software that, when executed by processing module 128, causes processing module 128 to process the wireless communications that are received by receiver 130. Speaker 134 is configured to generate sound based on the received wireless communications. For example, speaker 134 may generate the sound based on an audio signal, including period(s) of voice and period(s) of comfort noise, that is received from processing module 128. The microphone is configured to detect sound (e.g., a voice of a user of headset 112).

Headset 112 may include a transmitter in addition to receiver 130. For instance, a transmitter and receiver 130 may be included in a transceiver that is configured to transmit communications to and receive communications from VoIP-enabled device 102 using wireless communication channel 114.

Communications that are transferred via wireless communication channel 114 use a communication protocol that is different from a protocol used by communications that are transferred via VoIP communication channel(s) 108 and/or 110. For example, communications that are transferred via wireless communication channel 114 may use a Bluetooth wireless protocol. In another example, communications that are transferred via VoIP communication channel(s) 108 and/or 110 may use a 4G and/or LTE VoIP protocol. Persons skilled in the relevant art(s) will recognize that the Bluetooth and 4G/LTE VoIP protocols are provided for illustrative purposes and are not intended to be limiting. For example, other wireless communication protocols may be used in addition to or instead of Bluetooth, such as Digital Enhanced Cordless Telecommunication (DECT), wireless USB, Wi-Fi (IEEE 802.11), Ultra-Wideband (UWB), ZigBee (IEEE 802.15.4) and/or other types of wireless communication protocols. Also, other VoIP communication protocols may be used in addition to or instead of the 4G/LTE communication protocol, such as H.323, Session Initiation Protocol (SIP), Media Gateway Control Protocol (MGCP), and/or other types of VoIP communication protocols.

FIG. 2 shows a block diagram of a VoIP communication system 200 in accordance with an embodiment described herein. As shown in FIG. 2, VoIP communication system 200 includes a VoIP-enabled device 202 that communicates with a transmitting device 204 over a network 206. VoIP-enabled device 202 transmits communications including voice data toward transmitting device 204 over network 206 using a first VoIP communication channel 208. Transmitting device 204 transmits communications including voice data toward VoIP-enabled device 202 over network 206 using a second VoIP communication channel 210.

In an example embodiment, a communication transmitted by VoIP-enabled device 202 using VoIP communication channel 208 or by transmitting device 204 using VoIP communication channel 210 is substantially the same as a communication received by transmitting device 204 using VoIP communication channel 210 or by VoIP-enabled device 202 using VoIP communication channel 208, respectively. In another example embodiment, one or more devices (not shown) in network 206 may translate, convert, or otherwise change one or more characteristics (e.g., data format or address format) of a communication that is transmitted using VoIP communication channel 208 or VoIP communication channel 210.

VoIP-enabled device 202 includes a processing module 216, a VoIP receiver 218, storage 220, a packet monitor 222, a transmitter 224, and a power management module 226. VoIP receiver 218 is configured to receive incoming communications that are received from transmitting device 204 via network 206. An incoming communication may include voice data which represents speech. The speech may include period(s) of voice and period(s) of silence. A period of voice in the speech may be a portion of the speech in which human voice is detected. A period of silence in the speech may be a portion of the speech in which an absence of human voice is detected. In one example, the voice data may represent only periods of voice in the speech. In another example, the voice data may represent both periods of voice and periods of silence in the speech. In one example embodiment, the incoming communication includes voice data and a silence packet which indicates a period of silence in the speech. In accordance with this example embodiment, the silence packet may be a silence indicator (SID) packet in accordance with an LTE, 4G-based, and/or other suitable VoIP communication protocol.

VoIP-enabled device 202 may include a VoIP transmitter in addition to VoIP receiver 218. For instance, a VoIP transmitter and VoIP receiver 218 may be included in a VoIP transceiver that is configured to transmit VoIP communications to and receive VoIP communications from transmitting device 204 using VoIP communication channel(s) 208 and/or 210.

Processing module 216 is configured to process (e.g., decode) the incoming communications that are received by VoIP receiver 218. For example, processing module 216 may be configured to process an incoming communication to provide voice data that represents speech and a silence packet which indicates a period of silence in the speech. For example, if a silence packet is detected in the incoming communications, such as by packet monitor 222, processing module 216 may generate a silence indicator that is to be transmitted to headset 212, where the silence indicator specifies that headset 212 is to generate comfort noise and to incorporate the comfort noise in the speech during the period of silence. Processing module 216 is further configured to generate a voice signal and a silence indicator for wireless transmission to headset 212 using wireless communication channel 214. In an example embodiment, processing module 216 is configured to generate a voice signal that corresponds to the voice data received in the incoming communications by VoIP receiver 218. For example, processing module 216 may generate a voice signal based on the voice data included in the VoIP communication without modifying the voice data. The voice signal is operable to be wirelessly transmitted to headset 212. In accordance with this example, the voice signal represents the speech without comfort noise with respect to the period of silence. Thus, processing module 216 may not generate comfort noise.

In an example embodiment, if a silence packet is detected in the incoming communications, such as by packet monitor 222, processing module 216 may generate a silence indicator that corresponds to the silence packet received in the incoming communications by VoIP receiver 218. The silence indicator is operable to be wirelessly transmitted to headset 212. The silence indicator specifies that headset 212 is to generate comfort noise and to incorporate the comfort noise into the speech during the period of silence.

In another example embodiment, processing module 216 may generate a voice signal that is different from the voice data received in the incoming communications by VoIP receiver 218. For example, the voice signal may represent speech that has been modified, such as by using one or more digital signal processing (DSP) techniques, that has been time-offset, or that contains a different amount of voice data. Processing module 216 may analyze the voice data received in the incoming communications by VoIP receiver 218 and determine that the actual period of silence is longer or shorter than the period of silence indicated by the voice data and/or the silence packet received in the incoming communications.

Processing module 216 may include one or more processors, such as central processing units (CPUs), which are traditionally configured for performing many purposes, and/or digital signal processors (DSPs), which are traditionally designed specifically for digital signal processing. For instance, processing module 216 may include a DSP for processing the incoming communications that are received by VoIP receiver 218 and/or the wireless communication transmitted to headset 212.

Storage 220 is configured to store computer software that, when executed by processing module 216, causes processing module 216 to process voice data that is included in the incoming communications that are received by VoIP receiver 218.

Packet monitor 222 is configured to detect packets, such as silence packets, in the incoming communications that are received by VoIP receiver 218. In an example embodiment, packet monitor 222 detects a silence packet in the incoming communications that are received by VoIP receiver 218, where the silence packet indicates a period of silence in the speech that is represented by the voice data included in the incoming communications.

Transmitter 224 is configured to transmit wireless communications to headset 212 using wireless communication channel 214. VoIP-enabled device 202 may include a receiver in addition to transmitter 224. For instance, transmitter 224 and a receiver may be included in a transceiver that is configured to transmit wireless communications to and receive wireless communications from headset 212 using wireless communication channel 214. VoIP-enabled device 202 may also include a microphone (not shown) and a speaker (not shown), where the speaker may generate sound (e.g., based on incoming communications) and the microphone may detect sound.

In an example embodiment, VoIP-enabled device 202 wirelessly transmits a voice signal and a silence indicator to headset 212 using wireless communication channel 214. In an example embodiment, the voice signal that is wirelessly transmitted does not include the period of silence indicated by the silence packet. The voice signal that is wirelessly transmitted also does not include comfort noise with respect to the period of silence indicated by the silence packet.

In one implementation, VoIP-enabled device 202 may not include a noise generator for generating comfort noise. In another implementation, VoIP-enabled device 202 may include a noise generator, but may only use the noise generator when headset 212 is not used. In accordance with this implementation, VoIP-enabled device 202 may be configured to sense whether an associated headset, such as headset 212, is used. If an associated headset is not used, VoIP-enabled device 212 may locally generate comfort noise for a period of silence as indicated by the silence packet. The locally generated comfort noise may be generated by a speaker (not shown) that is local to VoIP-enabled device 202. If an associated headset is used, VoIP-enabled device 202 may not locally generate comfort noise.

Headset 212 is configured to process wireless communications that are received from VoIP-enabled device 202. Accordingly, headset 212 is said to be associated with VoIP-enabled device 202. Headset 212 includes a processing module 228, a receiver 230, and a storage 232, a speaker 234, a power management module 236, a monitor module 238, and a microphone (not shown).

Receiver 230 is configured to receive wireless communications from VoIP-enabled device 202 via wireless communication channel 214. For example, a wireless communication may include a voice signal that represents speech that does not include comfort noise with respect to a period of silence in the speech. In accordance with this example, the wireless communication may also include a silence indicator which specifies that headset 212 is to generate comfort noise and to incorporate the comfort noise in the speech during the period of silence.

Processing module 228 is configured to process the wireless communication received from VoIP-enabled device 202. For example, if a silence indicator is detected in the wireless communication, such as by monitor module 238, processing module 228 may generate comfort noise and incorporate the comfort noise into the period of silence in the speech in response to detection of the silence indicator in the wireless communication. Alternatively, if the silence indicator is detected in the wireless communication, such as by monitor module 238, processing module 228 may instead decrease the operating power of headset 212, such as by using power management module 236, to place headset 212 in a power saving state for a duration of the period of silence in response to detection of the silence indicator in the wireless communication. In an example embodiment, processing module 228 may make the decision to either generate comfort noise and incorporate the comfort noise into the period of silence in the speech or to decrease the operating power of headset 212 to place headset 212 in a power saving state for a duration of the period of silence based on one or more characteristics and/or user input. For example, a characteristic may include comparison of a current power level of headset 212 to a predefined threshold, though the scope of the example embodiments is not limited in this respect.

If processing module 228 generates comfort noise, processing module 228 may use the information contained in the silence indicator to generate comfort noise that has a type and/or a loudness as specified by the silence indicator. Processing module 228 may modify voice signal to incorporate the comfort noise (such as comfort noise generated by noise generator 240) into the speech during the periods of silence. For example, periods of silence may be interspersed between periods of voice in the speech. In accordance with this example, processing module 228 may fill the periods of silence with the comfort noise as specified by the silence indicator(s) included in the wireless communication received from VoIP-enabled device 202 via wireless communication channel 214. A voice signal that is modified or supplemented as described above with respect to processing module 228 may be referred to as modified voice signal.

In one implementation, processing module 228 may be configured to convert the modified voice signal to an audio signal that includes period(s) of voice and period(s) of comfort noise. The modified voice signal may be in a digital format, and the audio signal may be in an analog format, though the scope of the example embodiments is not limited in this respect. The audio signal may be in a form that is suitable for speaker 234 to generate sound that corresponds to the speech that is represented by the modified voice signal. In accordance with this example, processing module 228 may transmit the audio signal to speaker 234.

Storage 232 is configured to store computer software that, when executed by processing module 228, causes processing module 228 to process the wireless communications that are received by receiver 230. Speaker 234 is configured to generate sound based on the received wireless communications. For example, speaker 134 may generate the sound based on an audio signal corresponding to a modified voice signal, including period(s) of voice and period(s) of comfort noise, that is received from processing module 228. The microphone is configured to detect sound (e.g., a voice of a user of headset 212).

Processing module 228 may include one or more processors, such as central processing units (CPUs), which are traditionally configured for performing many purposes, and/or digital signal processors (DSPs), which are traditionally designed specifically for digital signal processing. For instance, processing module 228 may include a DSP for processing digitized voice or video signals represented in the packets of an incoming communication and/or wireless transmission.

Monitor module 238 is configured to detect a silence indicator in a wireless communication that is received via wireless communication channel 214 from VoIP-enabled device 202. For example, monitor module 238 may monitor the incoming communication to detect the silence indicator.

Monitor module 238 may communicate with processing module 228, such as to indicate to processing module 228 that a silence indicator has been detected in the wireless communications.

Noise generator 240 is configured to generate comfort noise that processing module 228 inserts in period(s) of silence in speech that is represented by voice signal that is included in the wireless communication. Noise generator 240 may communicate with processing module 228, such as to generate comfort noise in response to a request by processing module 228. For example, noise generator 240 may generate comfort noise and transmit the generated comfort noise to processing module 228.

Power management module 236 is configured to decrease an operating power of headset 212. For example, power management module may decrease an operating power of headset 212 to place headset 212 in a power saving state for a duration of the period of silence in response to detection of the silence indicator in the incoming communication. Power management module 236 may communicate with processing module 228, such as to decrease operating power of headset 212 in response to a request by processing module 228.

Monitor module 238 is configured to detect a silence indicator in the communication received from VoIP-enabled device 202. The microphone is configured to record sound. Headset 212 may include a transmitter in addition to receiver 230. For instance, a transmitter and receiver 230 may be included in a transceiver that is configured to transmit communications to and receive communications from VoIP-enabled device 202 using wireless communication channel 214.

Communications that are transferred via wireless communication channel 214 use a communication protocol that is different from a protocol used by communications that are transferred via VoIP communication channel(s) 208 and/or 210. For example, communications that are transferred via wireless communication channel 214 may use a Bluetooth wireless protocol. In another example, communications that are transferred via VoIP communication channel(s) 208 and/or 210 may use a 4G and/or LTE VoIP protocol. Persons skilled in the relevant art(s) will recognize that the Bluetooth and 4G/LTE VoIP protocols are provided for illustrative purposes and are not intended to be limiting. For example, other wireless communication protocols may be used in addition to or instead of Bluetooth, such as Digital Enhanced Cordless Telecommunication (DECT), wireless USB, Wi-Fi (IEEE 802.11), Ultra-Wideband (UWB), ZigBee (IEEE 802.15.4) and/or other types of wireless communication protocols. Also, other VoIP communication protocols may be used in addition to or instead of the 4G/LTE communication protocol, such as H.323, Session Initiation Protocol (SIP), Media Gateway Control Protocol (MGCP), and/or other types of VoIP communication protocols.

FIG. 3 depicts a flowchart 300 of a method for transmitting a silence indicator from a VoIP-enabled device to an associated headset in accordance with an embodiment described herein. The method of flowchart 300 will now be described in reference to certain elements of example VoIP communication system 200 that includes VoIP-enabled device 202 and associated headset 212 as described above with reference to FIG. 2. However, the method is not limited to that implementation.

As shown in FIG. 3, the method of flowchart 300 begins at step 302 in which packet monitor 222 detects a silence packet that is received in an incoming communication over VoIP communication channel 208 by VoIP-enabled device 202. In one example embodiment, VoIP receiver 218 may receive the incoming communication. In one implementation, processing module 216 may process the incoming communication to aid packet monitor 222 with detecting the silence packet in the incoming communication.

The incoming communication includes voice data which represents speech. The incoming communication also includes the silence packet which indicates a period of silence in the speech. For example, transmitting device 204 may transmit incoming communication via VoIP communication channel 210 over network 206 to VoIP-enabled device 202. In one implementation, the silence packet may be a SID packet. In one implementation, processing module 216 may process the silence packet, as described above with reference to FIG. 2, prior to step 304.

At step 304, transmitter 224 wirelessly transmits a voice signal to headset 212. The voice signal that is transmitted represents the speech without the comfort noise with respect to the period of silence. In an example embodiment, transmitter 224 wirelessly transmits the voice signal to headset 212 via wireless communication channel 214. In one implementation, transmitter 224 may wirelessly transmit the voice signal to headset 212 via wireless communication channel 214 using a communication protocol that is different from the communication protocol that is used by VoIP communication channel 208 and/or 210.

At step 306, transmitter 224 wirelessly transmits a silence indicator to headset 212 in response to detecting the silence packet in the incoming communication. The silence indicator specifies that headset 212 is to generate comfort noise and to incorporate the comfort noise into the speech. In an example embodiment, transmitter 224 wirelessly transmits a silence indicator to headset 212 via wireless communication channel 214. In one implementation, transmitter 224 may wirelessly transmit the silence indicator to headset 212 via wireless communication channel 214 using a communication protocol that is different from the communication protocol that is used by VoIP communication channel 208 and/or 210.

In an example embodiment, steps shown in flowchart 400 of FIG. 4 and/or steps shown in flowchart 500 of FIG. 5 are performed in addition to the steps shown in the flowchart 300 of FIG. 3. It is noted that the steps of methods of flowcharts 400 and 500 may be performed separately, sequentially in any order, or together in parallel, depending on the implementation. FIG. 4 depicts a variation of the flowchart shown in FIG. 3 in accordance with embodiments described herein.

The method of flowcharts 400 and 500 will now be described with reference to certain elements of example VoIP communication system 200 that includes VoIP-enabled device 202 and associated headset 212 as described above with reference to FIG. 2. However, the methods are not limited to that implementation.

As shown in FIG. 4, the method 400 includes a step 402 of decreasing an operating power of VoIP-enabled device 202 to place VoIP-enabled device 202 in a power saving state during the period of silence in response to detection of the silence packet in the incoming communication. With reference to FIG. 2, power management module 226 decreases the operating power of VoIP-enabled device 202 to place VoIP-enabled device 202 in a power saving state during the period of silence in response to detection of the silence packet in the incoming communication. For example, power management module 226 may decrease the operating power of VoIP-enabled device 202 from a normal operating state to a power saving state. In one implementation, power management module 226 may increase the operating power of VoIP-enabled device 202 back to the normal operating state from the power saving state after the duration of the period of silence. Continuing with this implementation, VoIP-enabled device 202 may first try to detect any additional silence packets prior to power management module 226 increasing the operating power of VoIP-enabled device 202 back to the normal operating state from the power saving state after the duration of the period of silence.

As shown in FIG. 5, the method 500 includes a step 502 of discontinuing wireless transmission of a voice signal from VoIP-enabled device 202 to headset 212 during the period of silence in response to detecting the silence packet in the incoming communication. In one implementation, VoIP-enabled device 202 operates in a normal power state when transmitting and receiving a VoIP and/or wireless communication. With reference to FIG. 2, transmitter 224 discontinues transmission of the voice signal from VoIP-enabled device 202 to headset 212 during the period of silence in response to detecting the silence packet in the incoming communication. In one implementation, transmitter 224 may re-start transmission of voice signals from VoIP-enabled device 202 to headset 212 after the duration of the period of silence. Continuing with this implementation, VoIP-enabled device 202 may first try to detect any additional silence packets prior to re-starting transmission of voice signals from VoIP-enabled device 202 to headset 212 after the duration of the period of silence.

FIG. 6 shows an example implementation of VoIP-enabled device 202 shown in FIG. 2 in accordance with an embodiment described herein. FIG. 6 illustrates that VoIP-enabled device 600 may include other elements in addition to, or in lieu of, packet monitor module 222. As shown in FIG. 6, VoIP-enabled device 600 includes a processing module 602, a power management module 604, a VoIP receiver 606, a silence detection module 608, and a transmitter 610.

VoIP receiver 606 is configured to receive an incoming communication from transmitting device 204 via network 206. In one example embodiment, the incoming communication includes voice data that represent speech including both the voice in the speech and period(s) of silence. The incoming communication may not distinguish, such as by including different data packets for period(s) of voice and period(s) of silence, between period(s) of voice in speech and period(s) of silence in speech. In accordance with the example embodiment, the voice data represents speech including one or more period(s) of silence and one or more period(s) of voice. For example, a transmitting device, such as transmitting device 204, may not be able to properly generate and transmit silence packets to VoIP-enabled device 600.

Processing module 602 is configured to process the incoming communication. If the period of silence is detected in the incoming communication, such as by using silence detection module 608, processing module 602 is configured to generate a silence indicator for transmission to a headset, such as headset 212. The silence indicator generated by processing module 602 may be analogous to the silence indicator described above with reference to FIGS. 2 and 3.

Silence detection module 608 is configured to detect a period of silence in the incoming communication. In an example embodiment, silence detection module 608 may include, or perform functionality of, a Voice Activity Detector ("VAD"). As known in the art, a VAD is configured to detect the presence or absence of human speech in a voice signal. Typically, a VAD will perform voice and/or period-of-silence detection while operating on a digital form of the voice signal.

In another example embodiment, processing module 602 and/or silence detection module 608 converts a plurality of voice packets received from transmitting device 204 via VoIP communication channel 208 and/or 210 from a digital format to an analog format. The plurality of voice packets may represent a voice signal. As a result, the analog communication includes the speech including both voice and period(s) of silence. Silence detection module 608 may determine whether the speech includes one or more period(s) of silence based on at least one characteristic of the analog communication that includes the speech. For example, the characteristic(s) may include a volume level of speech (i.e., a volume level threshold), a duration of a pause in the speech, a level of noise in the speech, and/or other characteristic(s). In an example embodiment, if silence detection module 608 determines that the speech includes a period of silence, silence detection module 608 may notify processing module 602 that the period of silence has been detected in the speech.

Transmitter 610 is configured to transmit wireless communications to a headset 212 using a wireless communication channel 214. The wireless communications may include voice signals and silence indicators, as described above. Storage 612 is configured to store computer software that, when executed by processing module 602, causes processing module 602 to process the content packets of the incoming communication.

FIG. 7 depicts another flowchart of a method for transmitting a silence indicator from a VoIP-enabled device to an associated headset in accordance with an embodiment described herein. The method of flowchart 700 will now be described in reference to certain elements of VoIP-enabled device 600 of FIG. 6 in the context of VoIP communication system 200 of FIG. 2. However, the method is not limited to that implementation.

As shown in FIG. 7, the method of flowchart 700 begins at step 702 in which VoIP-enabled device 600 receives incoming communication from a transmitting device, such as transmitting device 204, via VoIP communication channel 208 and/or 210. The incoming communication includes a plurality of voice packets which represent speech that includes a period of silence. In one implementation, the transmitting device 204 may not send silence packets to VoIP-enabled device 600. In another implementation, transmitting device 204 may send silence packets to VoIP-enabled device 600, but these silence packets may be unreadable and/or unrecognizable by VoIP-enabled device 600. For example, VoIP receiver 606 of VoIP-enabled device 600 may receive the incoming communication from transmitting device 204.

At step 704, silence detection module 608 of VoIP-enabled device 600 analyzes the plurality of voice packets to detect the period of silence in the speech. In one implementation, silence detection module 608 may use one or more silence detection techniques as known in the art. For example, silence detection module 608 may determine that speech represented by voice packets that has a volume level that is less than a predetermined threshold corresponds to the period of silence. In another example, silence detection module 608 may perform the functionality of a VAD to detect the period of silence, as described above with reference to FIG. 6.

At step 706, transmitter 610 of VoIP-enabled device 600 wirelessly transmits a voice signal to headset 212. The voice signal represents the speech without the comfort noise with respect to the period of silence. In one implementation, transmitter 224 may wirelessly transmit the voice signal to headset 212 via wireless communication channel 214 using a communication protocol that is different from the communication protocol used by VoIP communication channel 208 and/or 210. For example, transmitter 610 may wirelessly transmit voice signal to headset 212 using a Bluetooth communication protocol.

At step 708, transmitter 610 wirelessly transmits a silence indicator to headset 212 in response to the detection of the period of silence in the speech. The silence indicator indicates that headset 212 is to generate the comfort noise and to incorporate the comfort noise in the speech. In one implementation, the silence indicator may specify one or more of a type or a loudness of the comfort noise that is to be generated by headset 212. In one implementation, the silence indicator may specify the duration of the comfort noise to be generated by headset 212. In another implementation, transmitter 224 may wirelessly transmit the silence indicator to headset 212 via wireless communication channel 214 using a communication protocol that is different from the communication protocol used by VoIP communication channel 208 and/or 210.

FIG. 8 depicts yet another flowchart of a method for transmitting a silence indicator from a VoIP-enabled device to an associated headset in accordance with an embodiment described herein. The method of flowchart 800 will now be described with reference to certain elements of VoIP-enabled device 600 of FIG. 6 in the context of VoIP communication system 200 of FIG. 2. However, the method is not limited to that implementation.

As shown in FIG. 8, the method of flowchart 800 begins at step 802 in which VoIP-enabled device 600 receives digital communication from transmitting device 204 via VoIP communication channel 208. The digital communication includes a plurality of voice packets which represent speech. In one implementation, transmitting device 204 may not send silence packets to VoIP-enabled device 600. In another implementation, transmitting device 204 may send silence packets to VoIP-enabled device 600, but the silence packets may be unreadable and/or unrecognizable by VoIP-enabled device 600. For example, VoIP receiver 606 of VoIP-enabled device 600 may receive the incoming communication from transmitting device 204.

At step 804, processing module 602 and/or silence detection module 608 converts the digital communication to an analog communication that includes the speech. For example, the plurality of voice packets may be converted from being represented in a digital domain to being represented in an analog domain. In accordance with this example, the analog communication may be an analog waveform that represents speech and includes the period of silence in the speech.

At step 806, silence detection module 608 determines that the speech includes a period of silence based on at least one characteristic of the analog communication that includes the period of silence. For example, silence detection module 608 may analyze the analog communication (e.g., the analog waveform) to detect the period of silence in the speech. In one implementation, silence detection module 608 may use one or more silence detection techniques as known in the art. For example, silence detection module 608 may determine that speech in the analog communication that has a volume level that is less than a predetermined threshold corresponds to the period of silence. In another example, silence detection module may perform the functionality of a VAD to detect the period of silence in the analog communication, as described above with reference to FIG. 6.

At step 808, VoIP-enabled device 600 wirelessly transmits a voice signal to headset 212. The voice signal represents the speech without the comfort noise with respect to the period of silence. In one implementation, transmitter 610 may wirelessly transmit the voice signal to headset 212 via wireless communication channel 214 using a communication protocol that is different from the communication protocol used by VoIP communication channel 208 and/or 210. For example, transmitter 610 may wirelessly transmit the voice signal to headset 212 using a Bluetooth communication protocol.

At step 810, VoIP-enabled device 600 wirelessly transmits a silence indicator to headset 212 in response to the detection of the period of silence in the speech. The silence indicator indicates that headset 212 is to generate the comfort noise and to incorporate the comfort noise in the speech. In one implementation, the silence indicator may specify one or more of a type or a loudness of the comfort noise that is to be generated by headset 212. In one implementation, the silence indicator may specify the duration of the comfort noise to be generated by headset 212. In another implementation, transmitter 610 may wirelessly transmit the silence indicator to headset 212 via wireless communication channel 214 using a communication protocol that is different from the communication protocol used by VoIP communication channel 208 and/or 210.

In an example embodiment, steps shown in flowchart 900 of FIG. 9 and/or steps shown in flowchart 1000 of FIG. 10 are performed in addition to the steps shown in the flowchart 700 of FIG. 7 or the flowchart 800 of FIG. 8. It is noted that the steps of methods of flowcharts 900 and 1000 may be performed separately, sequentially in any order, or together in parallel, depending on the implementation.

The methods of flowcharts 900 and 1000 will now be described in reference to certain elements of VoIP-enabled device 600 of FIG. 6 in the context of VoIP communication system 200 of FIG. 2. However, the methods are not limited to that implementation.

As shown in FIG. 9, the method of flowchart 900 includes a step 902 of decreasing an operating power of VoIP-enabled device 600 to place the VoIP-enabled device 600 in a power saving state during the period of silence in response to the detection of the period of silence in the speech (or in response to determining that the speech includes a period of silence based on at least one characteristic of the analog communication that includes the period of silence with reference to FIG. 8). With reference to FIG. 6, power management module 604 decreases the operating power of VoIP-enabled device 600. For example, power management module 604 may decrease the operating power of VoIP-enabled device 600 from a normal operating state to a power saving state. In one implementation, power management module 604 may increase the operating power of VoIP-enabled device 600 back to the normal operating state from the power saving state after the duration of the period of silence. Continuing with this implementation, VoIP-enabled device 600 may first try to detect any additional periods of silence prior to power management module 604 increasing the operating power of VoIP-enabled device 600 back to the normal operating state from the power saving state after the duration of the period of silence.

As shown in FIG. 10, the method of flowchart 1000 includes a step 1002 of discontinuing transmission of voice signal from VoIP-enabled device 400 to headset 212 during the period of silence in response to detection of the period of silence in the speech (or in response to determining that the speech includes a period of silence based on at least one characteristic of the analog communication that includes the period of silence with reference to FIG. 8). In one implementation, VoIP-enabled device 600 operates in a normal power state when transmitting and receiving a VoIP and/or wireless communication. With reference to FIG. 6, transmitter 610 discontinues transmission of voice signal from VoIP-enabled device 600 to headset 212. In one implementation, transmitter 610 may re-start transmission of voice signals from VoIP-enabled device 600 to headset 212 after the duration of the period of silence. Continuing with this implementation, VoIP-enabled device 600 may first try to detect any additional period(s) of silence prior to re-starting transmission of the voice signals from VoIP-enabled device 600 to headset 212 after the duration of the period of silence.

FIG. 11 depicts a flowchart 1100 of a method for performing an action in response to detecting a silence indicator at a headset in accordance with an embodiment described herein. The method of flowchart 1100 will now be described in reference to certain elements of example VoIP communication system 200 that includes VoIP-enabled device 202 and associated headset 212 as described above with reference to FIG. 2. However, the method is not limited to that implementation.

As shown in FIG. 11, the method of flowchart 1100 begins at step 1102 in which a silence indicator is detected in an incoming communication that is received by headset 212 from VoIP-enabled device 202 via wireless communication channel 214. The incoming communication includes voice signal which represents speech that does not include comfort noise with respect to a period of silence in the speech. The incoming communication further includes a silence indicator which specifies that headset 212 is to generate comfort noise and to incorporate the comfort noise in speech during the period of silence. In one implementation, receiver 230 may receive the incoming communication from VoIP-enabled device 202. Monitor module 238 detects the silence indicator in the incoming communication. In one implementation, processing module 228 may aid monitor module 238 with detecting the silence indicator in the incoming communication.

At step 1104, a determination is made whether to generate comfort noise. For example, headset 212 may determine whether to generate comfort noise in response to detecting the silence indicator in the incoming communication from VoIP-enabled device 202. In one implementation, processing module 228 may be configured to decide whether to generate comfort noise. This determination may be pre-configured by a user of headset 212, or determined by processing module 228 based on various characteristics of headset 212, the speech, and/or a detected user activity.

At step 1106, comfort noise is generated during the period of silence in response to detecting the silence indicator. In one implementation, noise generator 240 generates comfort noise during the period of silence in response to detecting the silence indicator. As described above with reference to FIG. 2, noise generator 240 may provide the generated comfort noise to processing module 228. Processing module 228 may incorporate the generated comfort noise from noise generator 240 into portions of the speech in which there would otherwise be silence. In one implementation, noise generator 240 and/or processing module 228 may be configured to send audio signals, such as analog audio signals, to speaker 234. The audio signals may enable speaker 234 to generate an audio sound corresponding to the comfort noise. For example, the audio signals may enable speaker 234 to generate comfort noise having a given type and/or loudness, as specified by the silence indicator.

At step 1108, the comfort noise is not generated. Instead, an operating power of headset 212 is decreased to place headset 212 in a power saving state during the period of silence in response to detecting the silence indicator in the incoming communication. For example, power management module 236 may decrease an operating power of headset 212 to place headset 212 in a power saving state during the period of silence in response to detecting the silence indicator in the incoming communication.

In one implementation, power management module 236 may increase the operating power of headset 212 back to the normal operating state from the power saving state after the duration of the period of silence. Continuing with this implementation, headset 212 may first try to detect any additional silence indicators prior to power management module 236 increasing the operating power of headset 212 back to the normal operating state from the power saving state after the duration of the period of silence.

In an example embodiment, steps shown in flowchart 1200 of FIG. 12 are performed in addition to the steps shown in the flowchart 1100 of FIG. 11. The method of flowchart 1200 will now be described in reference to certain elements of example VoIP communication system 200 that includes VoIP-enabled device 202 and associated headset 212 as described above with reference to FIG. 2. However, the method is not limited to that implementation.

As shown in FIG. 12, the method of flowchart 1200 begins at step 1202 in which wireless communication channel 214 is monitored to detect a silence indicator. For example, monitor module 238 may monitor wireless communication channel 214 to detect the silence indicator. In one implementation, a communication sent via wireless communication channel 214 may use a Bluetooth communication protocol. In another implementation, monitor module 238 monitors wireless communication channel 214 to detect the silence indicator as well as a voice signal.

At step 1204, monitoring of wireless communication channel 214 is discontinued during the period of silence in response to detecting the silence indicator. For example, monitor module 238 may discontinue monitoring of wireless communication channel 214 during the period of silence in response to detecting the silence indicator. In one implementation, wireless communication channel 214 may use a Bluetooth communication protocol.

III. Example Computer System Implementation

The embodiments described herein, including systems, methods/processes, and/or apparatuses, may be implemented using well known computers, such as computer 1300 shown in FIG. 13. For example, elements of VoIP communication system 200 including VoIP-enabled device 202 and headset 212 and elements thereof (e.g., VoIP-enabled device 600 and elements thereof), each of the steps of flowchart 300 depicted in FIG. 3, the step of flowchart 400 depicted in FIG. 4, the step of flowchart 500 depicted in FIG. 5, each of the steps of flowchart 700 depicted in FIG. 7, each of the steps of flowchart 800 depicted in FIG. 8, the step of flowchart 900 depicted in FIG. 9, the step of flowchart 1000 depicted in FIG. 10, each of the steps of flowchart 1100 depicted in FIG. 11, and each of the steps of flowchart 1200 depicted in FIG. 12 can each be implemented using one or more computers 1300.

Computer 1300 can be any commercially available and well known computer capable of performing the functions described herein, such as computers available from International Business Machines, Apple, Sun, HP, Dell, Cray, etc. Computer 1300 may be any type of computer, including a desktop computer, a laptop computer, etc.

As shown in FIG. 13, computer 1300 includes one or more processors (e.g., central processing units (CPUs) or digital signal processors (DSPs)), such as processor 1306. Processor 1306 may include processing module 216, power management module 226, and/or packet monitor 222 of VoIP-enabled device 202 of FIG. 2; processing module 228, power management module 236, monitor module 238, and/or noise generator 240 of headset 212 of FIG. 2; processing module 602, power management module 604, and/or silence detection module 608 of FIG. 6; or any portion or combination thereof, for example, though the scope of the present invention is not limited in this respect. Processor 1306 is connected to a communication infrastructure 1302, which may include, for example, a communication bus. In some embodiments, processor 1306 can simultaneously operate multiple computing threads.

Computer 1300 also includes a primary or main memory 1308, such as a random access memory (RAM). Main memory has stored therein control logic 1324A (computer software), and data.

Computer 1300 also includes one or more secondary storage devices 1310. Secondary storage devices 1310 include, for example, a hard disk drive 1312 and/or a removable storage device or drive 1314, as well as other types of storage devices, such as memory cards and memory sticks. For instance, computer 1300 may include an industry standard interface, such as a universal serial bus (USB) interface for interfacing with devices such as a memory stick. Removable storage drive 1314 represents a floppy disk drive, a magnetic tape drive, a compact disk drive, an optical storage device, tape backup, etc.

Removable storage drive 1314 interacts with a removable storage unit 1316. Removable storage unit 1316 includes a computer useable or readable storage medium 1318 having stored therein computer software 1324B (control logic) and/or data. Removable storage unit 1316 represents a floppy disk, magnetic tape, compact disc (CD), digital versatile disc (DVD), Blue-ray disc, optical storage disk, memory stick, memory card, or any other computer data storage device. Removable storage drive 1314 reads from and/or writes to removable storage unit 1316 in a well known manner.

It will be apparent to persons skilled in the relevant art(s) that any one or more of storage 220 and/or 232 of FIG. 2, and/or storage 612 of FIG. 6 may be included in main memory 1308, secondary memory 1310, removable storage unit 1316, or some combination thereof, though the scope of the present invention is not limited in this respect.

Computer 1300 also includes input/output/display devices 1304, such as monitors, keyboards, pointing devices, etc. For example, input/output/display devices 1304 may include speaker 234.

Computer 1300 further includes a communication or network interface 1320. Communication interface 1320 enables computer 600 to communicate with remote devices. For example, communication interface 1320 allows computer 1300 to communicate over communication networks or mediums 1322 (representing a form of a computer useable or readable medium), such as local area networks (LANs), wide area networks (WANs), the Internet, etc. Network interface 1320 may interface with remote sites or networks via wired or wireless connections. Examples of communication interface 1322 include but are not limited to a modem (e.g., for 3G and/or 4 G communication(s)), a network interface card (e.g., an Ethernet card for Wi-Fi and/or other protocols), a communication port, a Personal Computer Memory Card International Association (PCMCIA) card, a wired or wireless USB port, etc.

Control logic 1324C may be transmitted to and from computer 1300 via the communication medium 1322.

Any apparatus or manufacture comprising a computer useable or readable medium having control logic (software) stored therein is referred to herein as a computer program product or program storage device. This includes, but is not limited to, computer 1300, main memory 1308, secondary storage devices 1310, and removable storage unit 1316. Such computer program products, having control logic stored therein that, when executed by one or more data processing devices, cause such data processing devices to operate as described herein, represent embodiments of the invention.

The invention may be embodied in software, hardware, and/or firmware implementations other than those described herein. Any software, hardware, and firmware implementations suitable for performing the functions described herein can be used.

IV. Conclusion

While various embodiments of the present invention have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
    detecting a silence packet in an incoming communication that is received via a Voice over Internet Protocol (VoIP) communication channel by a VoIP-enabled device, the incoming communication including voice data which represents speech and the silence packet which indicates a period of silence in the speech;
    wirelessly transmitting a voice signal to a headset, the voice signal representing the speech without comfort noise with respect to the period of silence; and
    wirelessly transmitting a silence indicator to the headset in response to detecting the silence packet in the incoming communication, the silence indicator specifying that the headset is to generate comfort noise and to incorporate the comfort noise in the speech during the period of silence, wherein the silence indicator further specifies one or more of a type and a volume of the comfort noise that is to be generated by the headset.

2. The method of claim 1, further comprising:
    decreasing an operating power of the VoIP-enabled device to place the VoIP-enabled device in a power saving state during the period of silence in response to detecting the silence packet in the incoming communication.

3. The method of claim 1, further comprising:
    discontinuing wireless transmission of the voice signal to the headset during the period of silence in response to detecting the silence packet in the incoming communication.

4. The method of claim 1, wherein detecting the silence packet in the incoming communication comprises:
    detecting the silence packet in the incoming communication that is received in accordance with a first communication protocol, and
    wherein wirelessly transmitting the silence indicator to the headset comprises:
    wirelessly transmitting the silence indicator to the headset in accordance with a second communication protocol that is different from the first communication protocol.

5. The method of claim 4, wherein the first communication protocol is a VoIP communication protocol; and
    wherein the second communication protocol is a Bluetooth communication protocol.

6. A Voice over Internet Protocol-enabled (VoIP-enabled) device comprising:
    a packet monitor configured to detect a silence packet in an incoming communication that is received via a Voice over Internet Protocol (VoIP) communication channel, the incoming communication including voice data which represents speech and the silence packet which indicates a period of silence in the speech; and a wireless transmitter configured to:
wirelessly transmit a voice signal to a headset, the voice signal representing the speech without comfort noise with respect to the period of silence; and
wirelessly transmit a silence indicator to the headset in response to detection of the silence packet in the incoming communication, the silence indicator specifying that the headset is to generate comfort noise and to incorporate the comfort noise in the speech during the period of silence, wherein the silence indicator further specifies one or more of a type and a loudness of the comfort noise that is to be generated by the headset.

7. The VoIP-enabled device of claim 6, further comprising:
a power management module configured to decrease an operating power of the VoIP-enabled device to place the VoIP-enabled device in a power saving state during the period of silence in response to detection of the silence packet in the incoming communication.

8. The VoIP-enabled device of claim 6, wherein the wireless transmitter is further configured to discontinue transmission of the voice signal to the headset during the period of silence in response to detection of the silence packet in the incoming communication.

9. The VoIP-enabled device of claim 6, wherein the packet monitor is configured to detect the silence packet in the incoming communication that is received in accordance with a first communication protocol, and
wherein the wireless transmitter is further configured to wirelessly transmit the silence indicator to the headset in accordance with a second communication protocol that is different from the first communication protocol.

10. The VoIP-enabled device of claim 9, wherein the first communication protocol is a VoIP communication protocol; and
wherein the second communication protocol is a Bluetooth communication protocol.

11. A method comprising:
receiving an incoming communication that includes a plurality of voice packets via a Voice over Internet Protocol (VoIP) communication channel at a VoIP-enabled device, the plurality of voice packets representing speech that includes a period of silence;
analyzing the plurality of voice packets to detect the period of silence in the speech;
wirelessly transmitting a voice signal to a headset, the voice signal representing the speech without comfort noise with respect to the period of silence; and
wirelessly transmitting a silence indicator to the headset in response to detection of the period of silence in the speech, the silence indicator specifying that the headset is to generate comfort noise and to incorporate the comfort noise in the speech during the period of silence, wherein the silence indicator further specifies one or more of a type and a volume of the comfort noise that is to be generated by the headset.

12. The method of claim 11, further comprising:
decreasing an operating power of the VoIP-enabled device to place the VoIP-enabled device in a power saving state for a duration of the period of silence in response to detection of the period of silence in the speech.

13. The method of claim 11, further comprising:
discontinuing wireless transmission of the voice signal to the headset during the period of silence in response to detection of the period of silence in the speech.

14. The method of claim 11, wherein receiving the incoming communication comprises:
receiving the incoming communication in accordance with a first communication protocol, and
wherein wirelessly transmitting the silence indicator to the headset comprises:
wirelessly transmitting the silence indicator to the headset in accordance with a second communication protocol that is different from the first communication protocol.

15. The method of claim 14, wherein the first communication protocol is a VoIP communication protocol; and
wherein the second communication protocol is a Bluetooth communication protocol.

16. A method comprising:
receiving a digital communication that includes a plurality of voice packets via a Voice over Internet Protocol (VoIP) communication channel at a VoIP-enabled device, the plurality of voice packets representing speech;
converting the digital communication to an analog communication that includes the speech;
determining that the speech includes a period of silence based on at least one characteristic of a portion of the analog communication that includes the period of silence;
wirelessly transmitting a voice signal to a headset, the voice signal representing the speech without comfort noise with respect to the period of silence; and
wirelessly transmitting a silence indicator to the headset in response to determining that the speech includes the period of silence, the silence indicator specifying that the headset is to generate comfort noise and to incorporate the comfort noise in the speech during the period of silence, wherein the silence indicator further specifies one or more of a type and a volume of the comfort noise that is to be generated by the headset.

17. The method of claim 16, further comprising:
decreasing an operating power of the VoIP-enabled device to place the VoIP-enabled device in a power saving state during the period of silence in response to determining that the speech includes the period of silence.

18. The method of claim 16, further comprising:
discontinuing wireless transmission of the voice signal to the headset during the period of silence in response to determining that the speech includes the period of silence.

19. The method of claim 16, wherein receiving the digital communication comprises:
receiving the digital communication in accordance with a first communication protocol, and
wherein wirelessly transmitting the silence indicator to the headset comprises:
wirelessly transmitting the silence indicator to the headset in accordance with a second communication protocol that is different from the first communication protocol.

20. A method comprising:
detecting a silence indicator in an incoming communication that is received via a wireless communication channel by a headset from a Voice over Internet Protocol-enabled device, the incoming communication including a voice signal which represents speech that does not include comfort noise with respect to a period of silence in the speech and the silence indicator which specifies that the headset is to generate comfort noise and to incorporate the comfort noise in the speech during the period of silence, wherein the silence indicator further specifies one or more of a type and a volume of the comfort noise that is to be generated by the headset; and performing one of:

generating the comfort noise and incorporating the comfort noise in the speech during the period of silence in response to detecting the silence indicator in the incoming communication; or not generating the comfort noise, and decreasing an operating power of the headset to place the headset in a power saving state during the period of silence in response to detecting the silence indicator in the incoming communication.

21. The method of claim 20, further comprising:
monitoring the wireless communication channel to detect the silence indicator;
wherein decreasing the operating power of the headset comprises:
  discontinuing monitoring of the wireless communication channel during the period of silence in response to detecting the silence indicator in the incoming communication.

22. The method of claim 20,
wherein generating the comfort noise comprises:
generating the comfort noise having the one or more of the type and the volume that is specified by the silence indicator.

23. A headset comprising:
a monitor module configured to detect a silence indicator in an incoming communication that is received via a wireless communication channel from a Voice over Internet Protocol-enabled device, the incoming communication including a voice signal which represents speech that does not include comfort noise with respect to a period of silence in the speech and the silence indicator which specifies that the headset is to generate comfort noise and to incorporate the comfort noise in the speech during the period of silence, wherein the silence indicator further specifies one or more of a type and a volume of the comfort noise that is to be generated by the headset;
a power management module configured to decrease an operating power of the headset to place the headset in a power saving state for a duration of the period of silence in response to detection of the silence indicator in the incoming communication; and
a noise generator configured to generate comfort noise for the duration of the period of silence in response to detection of the silence indicator in the incoming communication.

24. The headset of claim 23, wherein the monitor module is further configured to monitor the wireless communication channel to detect the voice signal; and
wherein the monitor module is further configured to discontinue monitoring of the communication channel during the period of silence in response to detection of the silence indicator in the incoming communication.

25. The headset of claim 23,
wherein the noise generator is configured to generate the comfort noise to have the one or more of the type and the volume as indicated by the silence indicator.

* * * * *